(12) United States Patent
Nakahara

(10) Patent No.: US 7,209,486 B2
(45) Date of Patent: Apr. 24, 2007

(54) ADDRESS ACCESS SYSTEM AND METHOD THEREOF

(75) Inventor: Hiroyuki Nakahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1085 days.

(21) Appl. No.: 10/284,363

(22) Filed: Oct. 31, 2002

(65) Prior Publication Data

US 2003/0185207 A1    Oct. 2, 2003

(30) Foreign Application Priority Data

Mar. 28, 2002  (JP)  ............................. 2002-090291

(51) Int. Cl.
*H04L 12/28*    (2006.01)
*H04L 12/56*    (2006.01)

(52) U.S. Cl. ...................................... 370/401

(58) Field of Classification Search ........ 370/351–352, 370/389, 401, 465–466, 475, 400
See application file for complete search history.

(56) References Cited

U.S. PATENT DOCUMENTS 6,173,334 B1    1/2001    Matsuzaki et al.

2005/0135384 A1*    6/2005    Hipp et al. ................. 370/397
2005/0198238 A1*    9/2005    Sim et al. ................... 709/222
2006/0080446 A1*    4/2006    Bahl .......................... 709/227

FOREIGN PATENT DOCUMENTS

JP    11-112577 A    4/1999

* cited by examiner

*Primary Examiner*—Ajit Patel
(74) *Attorney, Agent, or Firm*—Staas & Halsey LLP

(57) ABSTRACT

An address translator of a first communication station transmits to a second communication station a transmission frame that is sent from a terminal in the first communication station to a terminal in the second communication station and includes the virtual private address of the terminal, after the address translator translates the virtual private address into a corresponding real private address, while it determines the global address of the second communication station based on the virtual private address and applies it to the frame. The address translator of the second communication station that received the frame sends a content of the transmission frame to the terminal indicated by the real private address included in the transmission frame.

13 Claims, 9 Drawing Sheets

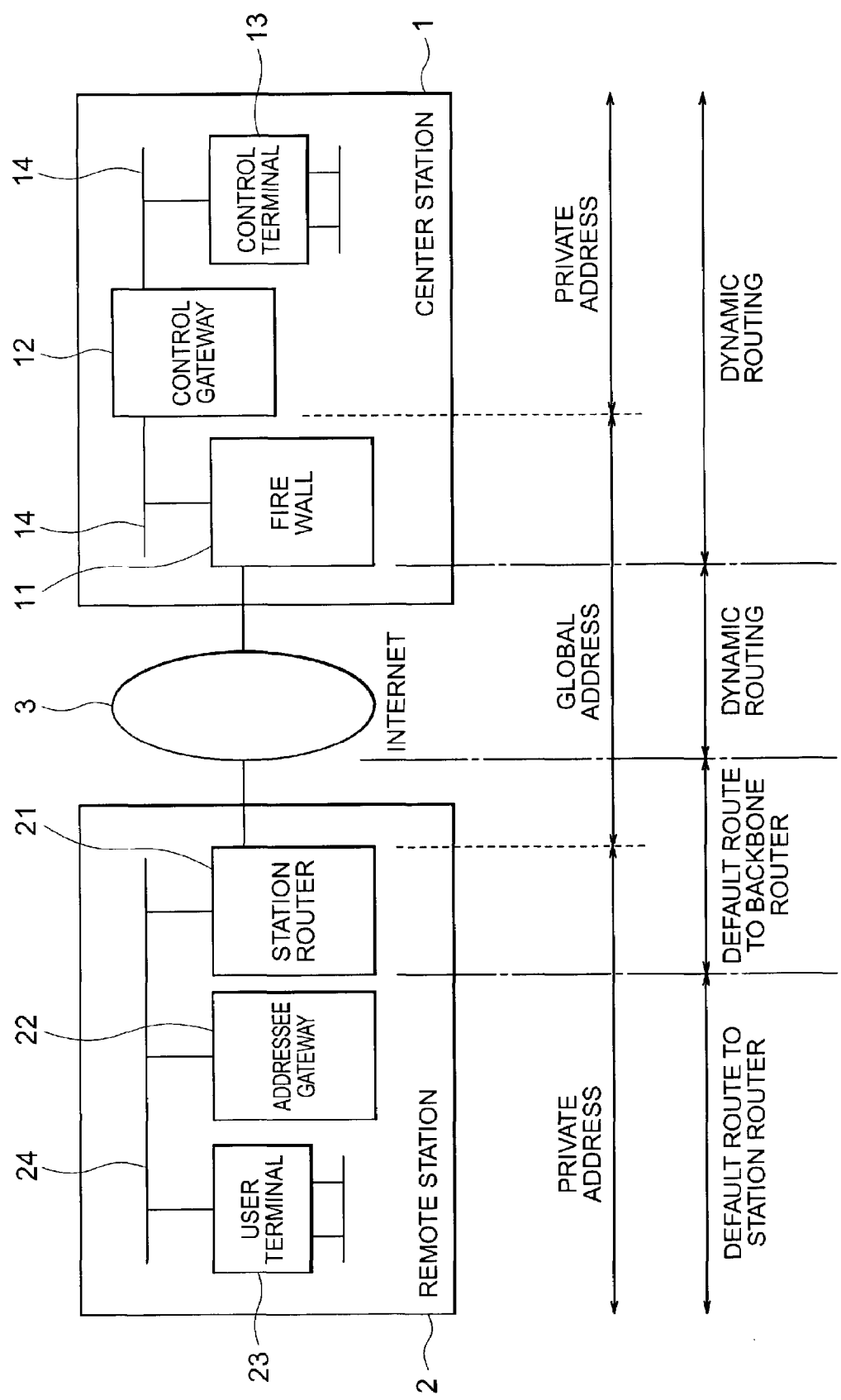

FIG. 3A

| CENTER STATION NAME | VIRTUAL IP ADDRESS | REAL IP ADDRESS |
|---|---|---|
| GW-A | | 192.168.2.100 |
| CONTROL TERMINAL A-1 | 192.168.1.101 | 192.168.2.1 |
| CONTROL TERMINAL A-2 | 192.168.1.102 | 192.168.2.2 |
| GW-B | | 192.168.3.100 |
| CONTROL TERMINAL B-1 | 192.168.5.111 | 192.168.3.1 |
| CONTROL TERMINAL B-2 | 192.168.5.112 | 192.168.3.2 |
| ～ | ～ | ～ |

| PRIORITY | ADDRESS |
|---|---|
| 1 | 192.168.2.100 |
| 2 | 192.168.5.100 |
| 3 | 192.168.7.100 |
| ～ | ～ |

| RETRY COUNT | RETRY INTERVAL IN SEC. |
|---|---|
| 50 | 120 |

| REMOTE STATION NAME | VIRTUAL IP ADDRESS | REAL IP ADDRESS |
|---|---|---|
| GW-A | | 192.168.1.100 |
| USER TERMINAL A-1 | 192.168.2.101 | 192.168.1.1 |
| USER TERMINAL A-2 | 192.168.2.102 | 192.168.1.2 |
| GW-B | | 192.168.3.100 |
| USER TERMINAL B-1 | 192.168.2.111 | 192.168.3.1 |
| USER TERMINAL B-2 | 192.168.2.112 | 192.168.3.2 |
| ∫ | ∫ | ∫ |

121

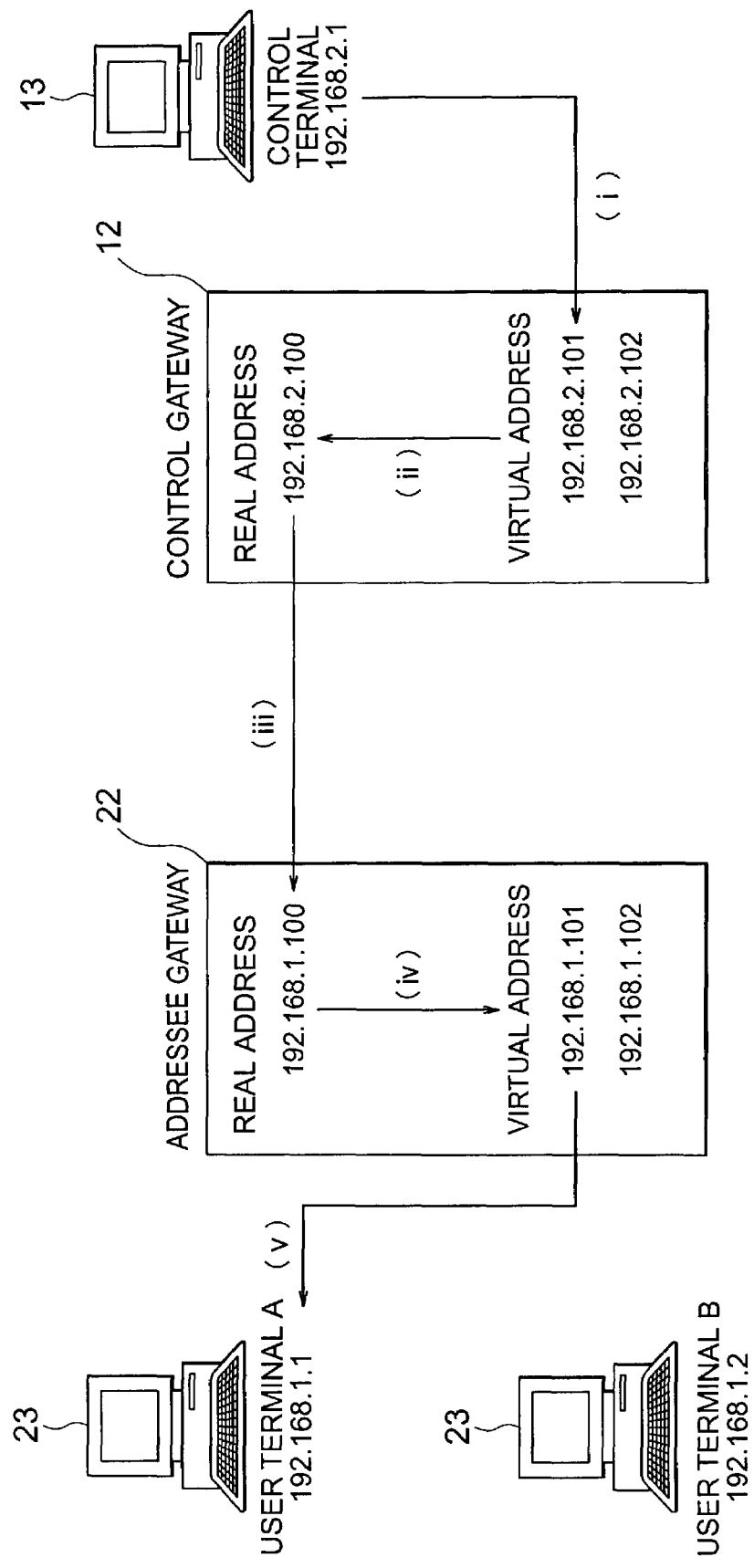

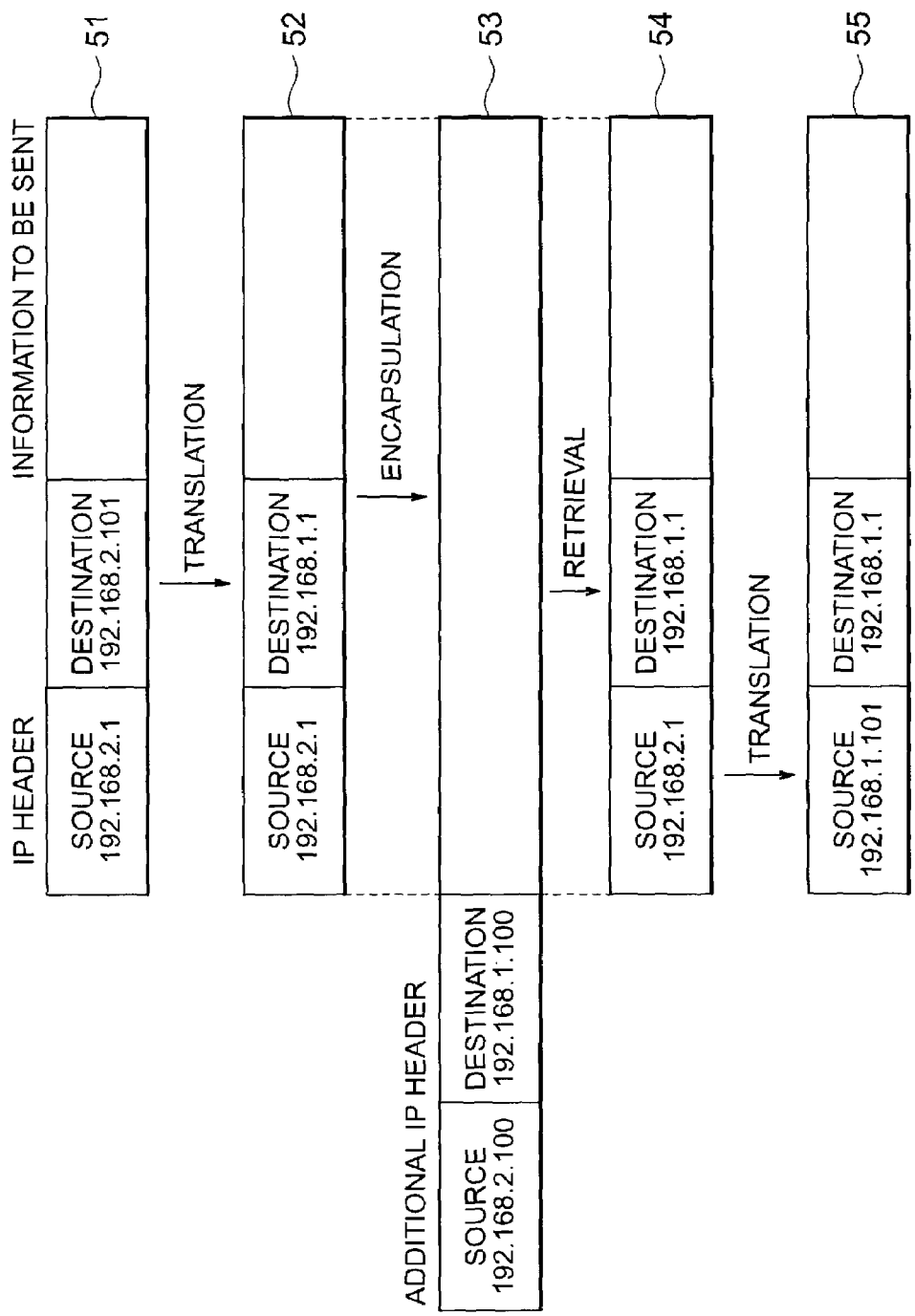

ADDRESS ACCESS SYSTEM AND METHOD THEREOF

BACKGROUND OF THE INVENTION

1. Field of the Invention

This invention relates to an address access system and method thereof, and specifically to an address access system that allows for accessing a private address located on a remote station from a center station, and method thereof.

2. Description of the Related Art

Global addresses such as an IP address (a network address and host address) that is an address on the Internet are limited by the total number. This causes shortage of global addresses. In many cases, therefore, only one global address can be assigned to each station (hosts, for example station routers, etc.) to be accessed.

In order to address such a situation, a controlled side (hereinafter referred to as a remote station) that may be accessed from a controlling side (hereinafter referred to as a center station) has employed a private address, aside from global addresses, as an internal address. In particular, a private address is assigned to a segment (e.g. gateway) of the remote station, and Network Address Translation (NAT) is performed in a connecting router etc. at the remote station. In this case, the address translation constitutes a 1-to-n address translation because of the existence of n private addresses for each global address.

As described above, because the 1-to-n address translation is performed in many cases, an access (creation of a TCP session) from a remote station to a center station is possible, while usually the creation of a TCP session from the center station to the remote station often may not be possible.

In order to provide a bi-directional, transparent access, each port is mapped to the segment (port mapping) in the connecting router etc. where NAT is performed at a remote station. This allows for creating a TCP session from a center station. If a port cannot be mapped in the connecting router etc. by any reason, however, the creation of a TCP session may not be possible from a center station. The mapping of a port in the connecting router etc. also impairs the security of the segment because it can be connected to from the Internet. Although using a security filter for protection may be considered, the connecting router etc. may be subject to an excessive load. Furthermore, addition of any segment (e.g. gateway) in a remote station or modification of any address in private addresses makes its administration complicate because the mapping of a port mapping in the connecting router etc. (and the setting of the security filter, if any) must be changed.

Means such as a Virtual Private Network (VPN) with IPSec etc. also provides for a bidirectional communication between a remote station and a center station. Similarly to the aforementioned case, an access (creation of a VPN session) from a remote station to a center station is possible, while usually the creation of a VPN session from the center station to the remote station has not been possible.

SUMMARY OF THE INVENTION

It is an object of the present invention to provide an address access system that allows for accessing a private address located on a remote station from a center station.

It is another object of the present invention to provide an address access method that allows for accessing a private address located on a remote station from a center station.

An address access system according to the present invention comprises first and second communication stations, each being provided with a global address and being a unit that communicates with each other. Each of the first and second communication stations comprises a terminal to which virtual and real private addresses are assigned, and an address translator that determines, from a virtual private address, corresponding real private and global addresses. The address translator of the first communication station transmits to the second communication station a transmission frame that is sent from the terminal belonging to the first communication station to the terminal belonging to the second communication station and includes the virtual private address of the terminal, after the address translator translates the virtual private address into the corresponding real private address, while it determines the global address of the second communication station based on the virtual private address and applies it to the frame. The address translator of the second communication station that received the transmission frame to which the global address is attached then sends a content of the transmission frame to the terminal indicated by the real private address included in the transmission frame.

An address access method according to the present invention relates to an address access system comprising: first and second communication stations, each being provided with a global address, being a unit that communicates with each other, and including a terminal to which virtual and real private addresses are assigned and an address translator that determines, from the virtual private address, corresponding real private and global addresses; and a network to connect the first and second communication stations. The terminal belonging to the first communication station transmits to the address translator in the first communication station a transmission frame that includes the virtual private address of the terminal to be sent to the terminal belonging to the second communication station. The address translator of the first communication station transmits the frame to the second communication station after it translates the virtual private address in the transmission frame into the corresponding real private address, while it determines the global address of the second communication station based on the virtual private address and applies it to the frame. The address translator of the second communication station receives the transmission frame to which the global address is attached and sends a content of the transmission frame to the terminal indicated by the real private address included in the transmission frame.

According to an address access system and method of the present invention, a destination terminal can be directly specified using a virtual private address, while corresponding real private and global addresses can be determined from the virtual private address. This allows a destination terminal to be specified directly, allowing for a bi-directional access between the first and second communication stations, while an address translator (NAT) performs a 1-to-n address translation. This means that both an access from a remote station to a center station and an access from a center station to a remote station can be provided. Such a bi-directional access can, therefore, eliminate the need of relying on means such as a port mapping or VPN, and does not cause segment security impairment as is often the case with the use of a port mapping, and thus eliminates the need of using a security filter, avoiding a growing load on an address translator. Furthermore, even when any private address is added or modified in a communication station, only the correlation between a virtual private address and a real private address/ global address in the address translator can be changed to accommodate it, allowing for easier administration in contrast with the trouble inherent to changing the mapping of a port mapping and the setting of a security filter. Terminals in communication stations can, therefore, be easily added or removed to flexibly change the system configuration.

BRIEF DESCRIPTION OF THE DRAWINGS

FIG. 2 illustrates an address access.

FIG. 3 illustrates an address access, especially FIG. 3A shows an example of an addressee table, FIG. 3B shows an example of a priority table, and FIG. 3C shows an example of a retry condition table.

FIG. 4 illustrates an address access.

FIG. 8 illustrates the address translation process in a gateway.

FIG. 9 illustrates the address translation process in a gateway.

DETAILED DESCRIPTION OF THE PREFERRED EMBODIMENTS

Figure 1:
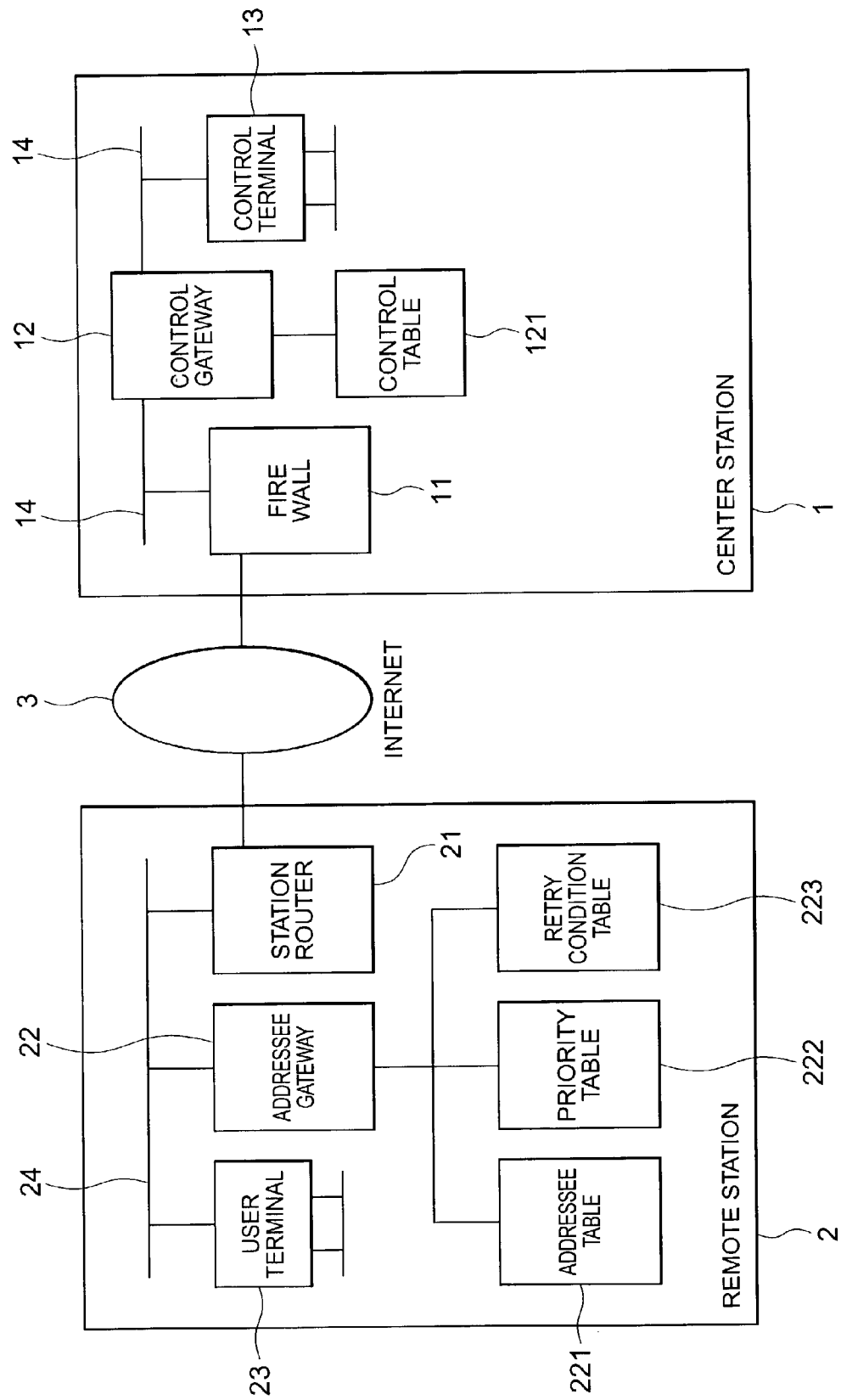
FIG. 1 illustrates an address access system.

FIG. 1 shows an address access system block diagram, and schematically shows a configuration of an address access system of the present invention.

The address access system comprises a center station 1, a remote station 2, and a network 3 for the connection between them. In this example, the center station 1 is the first communication station and the remote station 2 is the second communication station. One of the first and second communication stations may be the center station 1 and the other may be the remote station 2. Each of the center station 1 and the remote station 2 is a single unit of access to which a unique global address (a global IP address for an Internet 3) is assigned. The network 3 comprises the Internet 3 and includes a backbone router (not shown).

The center station 1 controls (a user terminal 23 of) the remote station 2 and comprises a fire wall 11, control gateway 12, control terminal 13, and a network such as Local Area Network (LAN) 14. The control gateway 12 comprises a control table 121, as described below. The fire wall 11 is connected to (a corresponding backbone router, not shown, of) the Internet 3. The control gateway 12 is an address translator (NAT) that relays a communication from the control terminal 13 to the remote station 2, and, at that time, refers to the control table 121 to perform a 1-to-n network address translation (or emulation). The control terminal 13 is used by an administrator and controls the remote station 2. The control terminal 13 sends a transmission frame in a predetermined data format to the user terminal 23. LAN 14 is terminated at its both ends, which are not shown.

The remote station 2 is controlled by (the control terminal 13 of) the center station 1, and comprises a station router 21 such as a DSL router, addressee gateway 22, user terminal 23, and a network such as Local Area Network (LAN) 24. The addressee gateway 22 comprises an addressee table 221, priority table 222, and retry condition table 223, as described below. The station router 21 is connected to (a corresponding backbone router, not shown, of) the Internet 3. The addressee gateway 22 is an address translator (NAT) that relays a communication from the user terminal 23 to the center station 1, and, at that time, refers to the addressee table 221 to perform a 1-to-n network address translation (or emulation). The user terminal 23 is used by a user, and makes an access to the center station 1. The user terminal 23 sends a transmission frame in a predetermined data format to the control terminal 13. LAN 24 is terminated at its both ends, which are not shown.

The control gateway 12 and addressee gateway 22 may be any of a relay server, proxy server, and VPN router, etc. for example, provided that each of them provides the equivalent processing; the control gateway 12 and addressee gateway 22 may be any address translator (NAT, i.e. a device performing NAT) that determines, from a virtual private address specified as a destination in a transmission frame, corresponding real private and global addresses in relaying a communication from the control terminal 13 or the user terminal 23.

The control gateway 12 and addressee gateway 22 also have an identical configuration, and are implemented by executing a program that performs an address translation (or address emulation) according to the present invention in a computer serving as the gateway. The address translation (or address emulation) program may be recorded in and provided by a recording medium such as a flexible disk, CD-ROM, CDR/W or DVD.

FIG. 2 now shows an example of a concept of a real global address, real private address, and virtual private address according to the present invention.

In the center station 1, a global address (real IP address) given to it is assigned for each of the control gateway (address translator) 12. For the control terminal 13, a unique real private address (real IP address) is assigned to it. In the remote station 2, a global address (real IP address) given to it is assigned to a port between the remote station 2 and the Internet 3, i.e. a junction point between the station router 21 and the Internet 3. For the user terminal 23, a unique real private address (real IP address) is assigned to it.

According to the present invention, a virtual private address (virtual IP address) is assigned to each of the center station 1 (fire wall 11), control gateway 12, control terminal 13, remote station 2 (station router 21), addressee gateway 22, user terminal 23, independently of these real IP addresses. Each virtual private address corresponds on a one to one basis to one real private address and is intended to be unique.

In the remote station 2, virtual and real private addresses are used in a zone from the user terminal 23 to a junction point (port) of the station router 21 to the Internet 3. A global address is used in a zone from the junction point of the station router 21 to the control gateway 12. In the center station 1, virtual and real private addresses are used in a zone from the control gateway 12 to the control terminal 13.

In the present invention, a virtual private address is used to make an access to a private address zone. This means that the virtual private address of the user terminal 23 is used to make an access to the user terminal 23 from the control terminal 13, and the virtual private address of the control terminal 13 is used to make an access to the control terminal 13 from the user terminal 23. Translation (emulation) from a virtual private address into a real private address is, thus, achieved by the control gateway 12 or addressee gateway 22. This allows for a system expansion independent of the number of the control terminals 13 and user terminals 23, respectively.

As shown in FIG. 2, routing is made in default from the user terminal 23 to the station router 21 and from the station router 21 to (a backbone router of) the Internet 3 within the remote station 2. Routing is made dynamically over the Internet 3 and no security is ensured. Within the center station 1, routing is made dynamically, while the security is ensured.

As described above, the addressee gateway 22 comprises the addressee table (center station/virtual IP correlation table) 221. The addressee table 221 is provided so that the addressee gateway 22 can make an access to the control terminal 13 in the center station 1, and describes a relation between a virtual private address and a real private address/global address in the center station 1. Using this table, the addressee gateway 22 can determine a real private address and global address, based on an access from the user terminal 23 that is using a virtual private address, to make an access to the control gateway 12 (or center station 1) and its control terminal 13.

In this way, an access can be achieved without changing the setting of gateways or routers by performing an address translation with the addressee table 221, facilitating the administration of the gateways or routers. In addition, in the case where the modification of an address in the gateway or router is not possible, for example, as in a CATV network comprised of a private network, this can be addressed by changing the addressee table 221 (and the control table 121 as described below) according to the present invention.

FIG. 3A shows an example of the addressee table 221. The addressee table 221 is arranged by storing (the name of) the control terminal 13 for each control gateway 12 (or the center station 1) and the virtual (private) IP address and real (private) IP address for each of the control terminal 13, and by storing the real (private) IP address for each control gateway 12 (or the center station 1).

The addressee gateway 22 also comprises the priority table (control gateway table) 222 and retry condition table 223. The priority table 222 defines a priority of access to the control gateway 12 from the addressee gateway 22. The retry condition table 223 defines retry conditions from the addressee gateway 22 to the control gateway 12 (or control terminal 13). The addressee gateway 22 is provided with the addressee table 221 for each control gateway 12 specified in the priority table 222.

FIG. 3B shows an example of the priority table 222. The priority table 222 stores global addresses (real addresses) of (one or more) control gateways 12 that are accessible from the addressee gateway 22, along with their priority. The addressee gateway 22 selects sequentially a control gateway 12 with higher priority to make an access (or create a TCP connection).

FIG. 3C shows an example of the retry condition table 223. The retry condition table 223 stores retry conditions consisting of the retry count and retry interval in seconds. The addressee gateway 22 retries to communicate according to the retry condition table 223. This means that, for example, if an attempt to create a TCP connection to the control gateway 12 fails, the attempt to create the TCP connection is repeated by the number of times defined by the retry count (e.g. 50 times) with a time interval defined by the retry interval in seconds (e.g. 120 sec.).

In this example, therefore, the addressee gateway 22 selects one control gateway 12 from a plurality of control gateways 12 in accessing the control terminal 13. In this example, if an attempt to make an access to a selected control gateway 12 fails, the addressee gateway 22 also retries to make the access by a predetermined number of times. This means that the addressee gateway 22 repeats retry attempts under the retry conditions according to the aforementioned priority of access in accessing the control gateway 12.

On the other hand, the control gateway 12 comprises the control table (remote station/virtual IP correlation table) 121, as described above. The control table 121 is provided in the control gateway 12 for accessing the user terminal 23 in the remote station 2 and describes a relation between a virtual private address and a real private address/global address in the remote station 2. Using this table, the control gateway 12 can determine a real private address and global address, based on an access from the control terminal 13 that is using a virtual private address, to make an access to the station router 21 (or remote station 2) and its user terminal 23.

FIG. 4 shows an example of the control table 121. The control table 121 stores the name of the user terminal 23 for each addressee gateway 22 (or the remote station 2), the virtual (private) IP address and real (private) IP address for each of the user terminal 23, and the real (private) IP address for each addressee gateway 22 (or the remote station 2).

Figure 5:
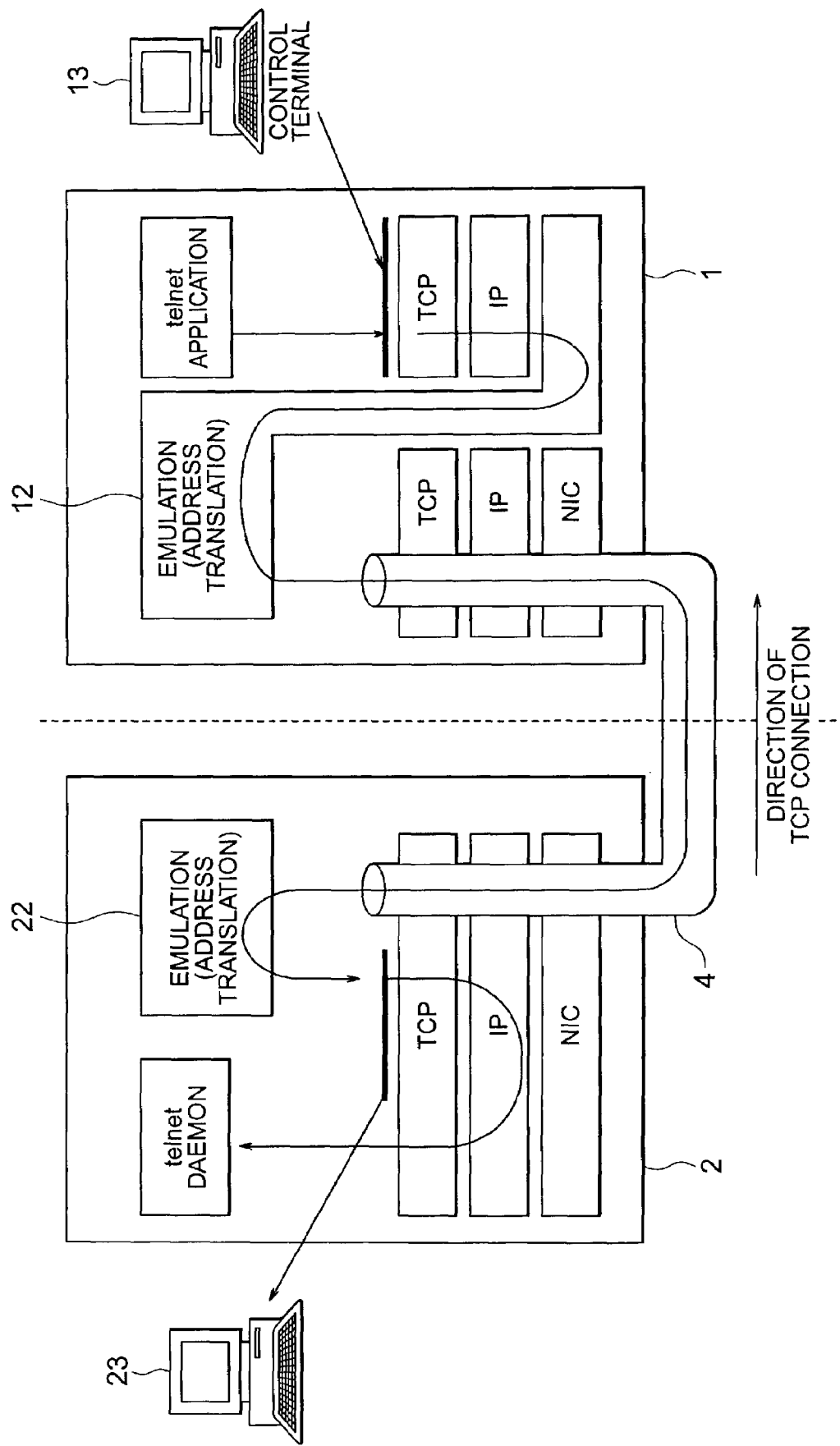
FIG. 5 illustrates an address access.

As can be seen from the foregoing description, a communication between the control terminal 13 and user terminal 23 may be accomplished as shown in FIG. 5. In the description below, an example will now be presented wherein a TCP connection is initially created from the station router 21 to the control gateway 12, and then the control terminal 13 makes an access to the user terminal 23. The same applies to the cases where a TCP connection is initially created from the control gateway 12 to the station router 21, or where the user terminal 23 makes an access to the control terminal 13 after the TCP connection has been created.

For example, the user terminal 23 initially transmits to the station router 21 a request for accessing the control terminal 13. Corresponding to this, the station router 21 creates a connection (TCP connection) 4 to the control gateway 12 at the TCP layer. The TCP connection is created between the station router 21 (the port of the remote station 2 for connecting to the Internet 3) and the control gateway 12. Bi-directional transmission and reception of transmission frames is then achieved between the user terminal 23 and the control terminal 13 through the TCP connection 4, as shown in FIG. 5.

Under the condition, the control terminal 13 of the center station 1, for example, sends a transmission frame addressed to the user terminal 23 of the remote station 2 that includes a virtual private address of the user terminal 23. In this example, the transmission frame is transmitted to the control gateway 12 of the center station 1 through the TCP, IP and NIC layers, as shown in FIG. 5. The control gateway 12 then refers to the control table 121 to convert the virtual private address in the transmission frame into the corresponding real private address, determines the global address of the station router 21 (of the remote station 2) based on the virtual private address and applies it to the transmission frame, and transmits it to the station router 21 (of the remote station 2) through the TCP connection 4.

The station router 21 that has received the transmission frame sends it to the addressee gateway 22. The addressee gateway 22 sends a content of the transmission frame to the user terminal 23 indicated by the real private address included in the transmission frame through the TCP and IP layers. Prior to this process, the addressee gateway 22 converts the real private address that is included in the transmission frame and indicates a source (the control terminal 13) into a corresponding virtual private address. This allows the user terminal 23 to verify the source.

General-purpose applications (programs) such as the TELNET or FTP applications allow for the remote control, maintenance, data translation, command execution and the like on the user terminal 23 connected to the addressee gateway 22 through the TELNET daemon, etc., as shown in FIG. 5.

Figure 6:
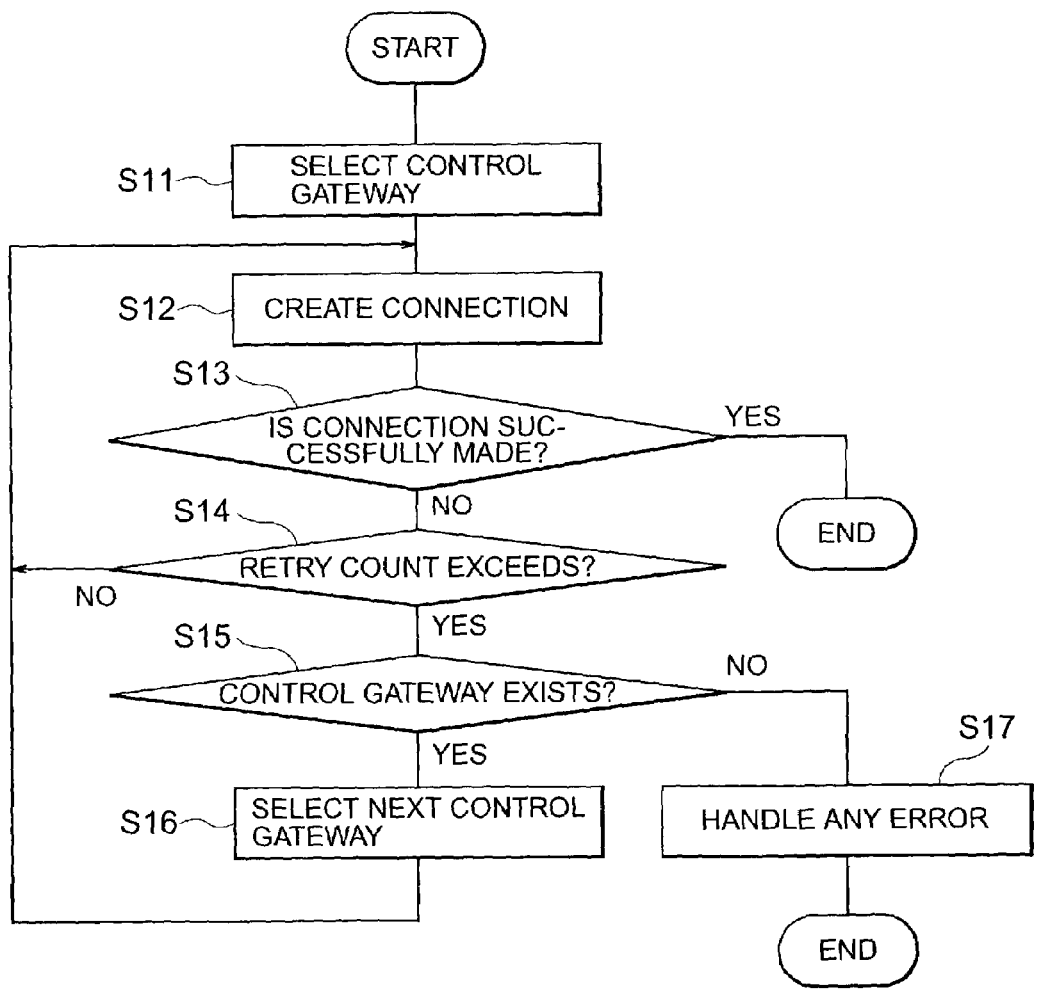
FIG. 6 shows a flow diagram of the process for connecting to a control gateway.

FIG. 6 shows a process flow for connecting (creating a TCP connection) to the control gateway 12 through the station router 21 from the addressee gateway 22. That is to say, it shows an example of a case where a TCP connection is first created from the station router 21 to the control gateway 12 as described above.

As the addressee gateway 22 selects the first control gateway (control server) 12 in the priority table 222 (Step S11), the station router 21 creates a TCP connection to the address of the selected control gateway 12 (Step S12) and verifies whether the connection has successfully been created or not (Step S13). When the connection (creation of a TCP connection) has successfully been established, the process terminates. If the connection has not successfully been created, then the addressee gateway 22 further refers to the retry condition table 223 to verify whether the number of attempts for accessing the selected control gateway 12 has reached the retry count or not (Step S14). If the retry count has not been reached yet, the addressee gateway 22 refers to the retry condition table 223, waits until the retry interval in seconds expires and causes the station router 21 to repeat Step S12. If the retry count has been reached, the addressee gateway 22 verifies whether there is another control gateway 12 having the next priority or not in the priority table 222 (Step S15), selects the next control gateway 12, if any, in the priority table 222 (Step S16), and causes the station router 21 to repeat Step S12. At Step S15, if there is no more control gateway 12 having the next priority, the addressee gateway 22 handles any error (Step S17) and terminates the process.

Figure 7:
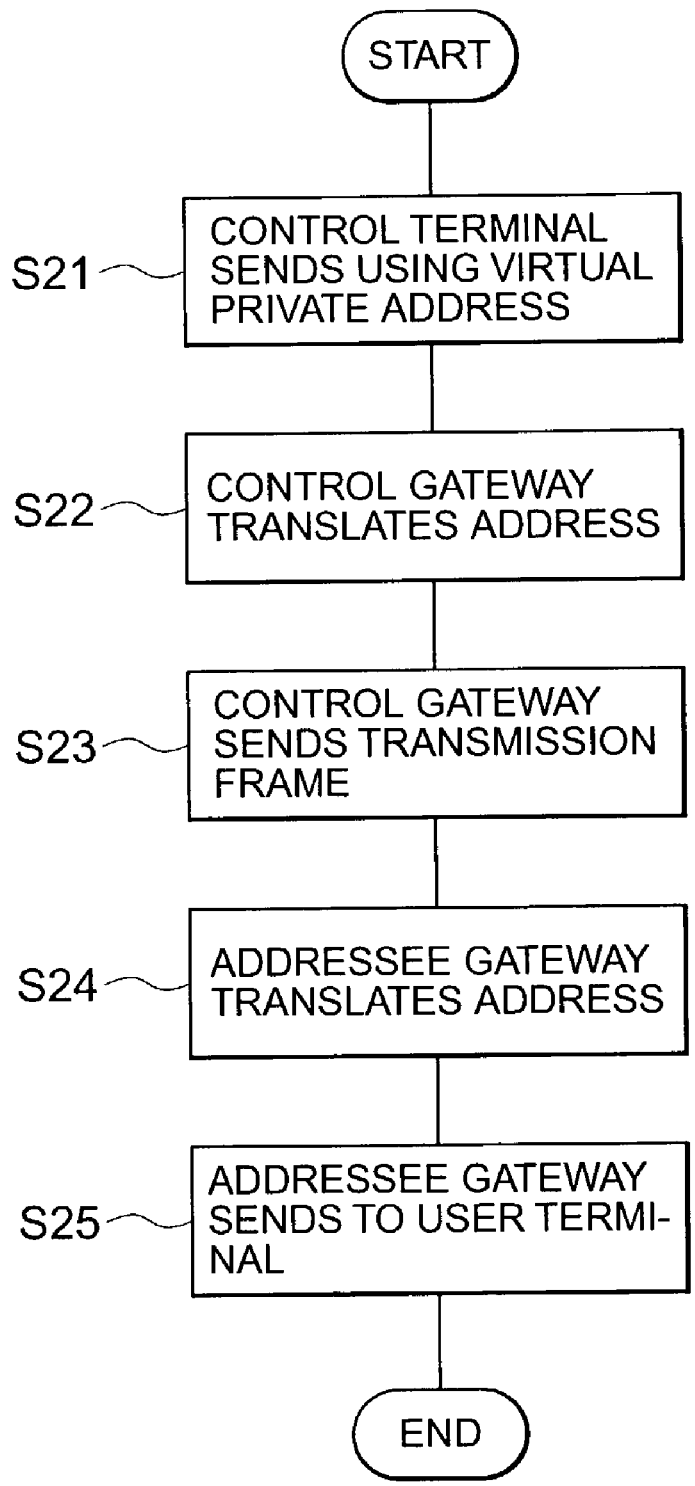
FIG. 7 shows a flow diagram of the address translation process in a gateway.

FIG. 7 shows a process flow of an address translation at a gateway. That is to say, it shows an example of a case where, after a TCP connection is first created from the station router 21 to the control gateway 12, the control terminal 13 makes an access to the user terminal 23 as described above. FIG. 8 and FIG. 9 also illustrate an address translation process at a gateway.

As shown in the process (i) of FIG. 8, the control terminal 13 with its real private address, 192.168.2.1, produces and sends the transmission frame 51 to a virtual private address, 192.168.2.101, that indicates the user terminal "A" (user terminal 23)(Step S21). At this time, the transmission frame 51 consists of the IP header and transmitted information, as shown in FIG. 9. The IP header consists of a source address and a destination address. The source address is the real private address, 192.168.2.1, of the source, i.e. the control terminal 13. The destination address is the virtual private address, 192.168.2.101, that indicates the destination, i.e. the user terminal "A". The transmitted information is a content of the frame.

As shown in the process (ii) of FIG. 8, when the control gateway 12 receives the transmission frame 51, it refers to the control table 121 using the destination address of the IP header as a key to perform an address translation or emulate the destination address, i.e. the virtual private address of the user terminal "A", 192.168.2.101, into the real private address of the user terminal "A", 192.168.1.1 (Step S22). This provides the transmission frame 52 as shown in FIG. 9.

As shown in the process (iii) of FIG. 8, the control gateway 12 then encapsulates the address-translated transmission frame 52, and applies a header (hereinafter referred to as an additional IP header) that includes the real global address of the addressee gateway 22, etc. to the frame, generating and sending the transmission frame 53 as shown in FIG. 9 to the addressee gateway 22 (Step S23). At this time, the additional IP header consists of a source address and a destination address. The source address is the real global address, 192.168.2.100, of the source, i.e. the control gateway 12. The destination address is the real global address, 192.168.1.100, of the destination, i.e. the addressee gateway 22.

When the addressee gateway 22 receives the transmission frame 53, it retrieves the content, i.e. an encapsulated transmission frame 54 from the transmission frame 53. At this time, the retrieved transmission frame 54 has a similar configuration to the transmission frame 52, as shown in FIG. 9. As shown in the process (iv) of FIG. 8, the addressee gateway 22 refers to the addressee table 221 using the source address of the IP header in the transmission frame 54 as a key to perform an address translation or emulate the source address, i.e. the real private address of the control terminal 13, 192.168.2.1, into the virtual private address that indicates the control terminal 13, 192.168.1.101 (Step S24). As a result of an address translation, the transmission frame 55 is provided as shown in FIG. 9. This notifies the virtual private address, 192.168.1.101, that indicates the source, i.e. the control terminal 13 to the destination, i.e. the user terminal "A", allowing the user terminal "A" to make an access to the control terminal 13.

The addressee gateway 22 then sends the address-translated transmission frame 55 to the user terminal "A" as shown in the process (v) of FIG. 8 (Step S25). This means that it sends the frame to the user terminal "A" with the real private address, 192.168.1.1, indicated by the source.

According to the present invention, as described above, directly specifying a destination terminal using a virtual private address and determining a corresponding real private address and global address from the virtual private address in an address access system and method provide for a bi-directional access between a remote station and a center station at a gateway etc. (address translator). Such a bi-directional access therefore does not impair the security or increase a load to an address translator caused by using the security filter, because it does not require means such as a port mapping or VPN. Furthermore, addition or modification of any private address in communication stations can be readily addressed by only making changes to tables in any gateway, etc. so that a user terminal and control terminal can be easily added or removed to flexibly change the system configuration.

What is claimed is:

1. An address access system comprising:
   first and second communication stations each being provided with a global address, the first and second communication stations each being a unit that communicates with each other; and
   a network to connect the first and second communication stations,
   wherein the first and second communication stations each comprises a terminal to which virtual and real private addresses are assigned, and an address translator determining, from the virtual private address, corresponding real private and global addresses,
   wherein the address translator of the first communication station transmits to the second communication station a transmission frame that is sent from the terminal belonging to the first communication station to the terminal belonging to the second communication station, the transmission frame including the virtual private address of the terminal, after the address translator translates the virtual private address into the corresponding real private address, while the address translator determines the global address of the second communication station based on the virtual private address and applies the global address to the frame, and wherein the address translator of the second communication station receiving the transmission frame to which the global address is attached sends a content of the transmission frame to the terminal indicated by the real private address included in the transmission frame.

2. An address access system according to claim 1, wherein the address translator of the second communication station sends the content of the transmission frame after the address translator of the second communication station translates the real private address included in the transmission frame into a corresponding virtual private address, the real private address indicating the terminal belonging to the first communication station.

3. An address access system according to claim 1,
wherein one of the first and second communication stations is a center station, the global address given to the center station is assigned for each address translator thereof, and the terminal of the center station is a control terminal, and
wherein the other of the first and second communication stations is a remote station, the global address given to the remote station is assigned to a port connecting its network, and the terminal of the remote station is a user terminal controlled by the control terminal.

4. An address access system according to claim 3,
wherein transmission/reception of the transmission frame occurs after TCP connection is created, and
wherein the TCP connection is created between the address translator of the center station and the port connecting the network of the remote station.

5. An address access system according to claim 3,
wherein the address translator of the center station has a table describing a relation between the virtual private address and the real private and global addresses in the remote station, the address translator using the table to determine the real private and global addresses based on the virtual private address, and
wherein the address translator of the remote station has a table describing a relation between the virtual private address and the real private and global addresses in the center station, the address translator using the table to determine the real private and global addresses based on the virtual private address.

6. An address access system according to claim 5,
wherein the address translator of the remote station further comprises:
a priority table defining a priority of access to the address translator of the center station; and
a retry condition table defining retry conditions, and
wherein the address translator of the remote station repeats retry attempts under the retry conditions according to the priority of access.

7. An address access system according to claim 6, wherein the address translator of the remote station selects an address translator of the center station according to the priority of access in the priority table, creates a TCP connection to the selected address translator of the center station, repeats retry attempts under the retry conditions according to the retry condition table in a case that the TCP connection has not successfully been created, and selects a next address translator of the center station according to the priority of access in the priority table in a case that the retry condition is reached.

8. An address access system according to claim 5, wherein the address translator of the remote station comprises a table describing a relation between the virtual private address and the real private and global addresses in the center station for each the address translator of the center station defined in the priority table.

9. An address access system according to claim 5,
wherein the center station further comprises:
a fire wall being connected to the network; and
a LAN connecting the fire wall, the terminal of the center station and the address translator of the center station, and
wherein the address translator of the center station is a gateway to relay a communication from the terminal of the center station to the remote station.

10. An address access system according to claim 9,
wherein the remote station further comprises:
a station router being connected to the network; and
a LAN connecting the station router, the terminal of the remote station and the address translator of the remote station, and
wherein the address translator of the remote station is a gateway to relay a communication from the terminal of the remote station to the center station.

11. An address access system according to claim 10, wherein the virtual and real private addresses are used in a zone from the user terminal to a junction point of the station router to the network in the remote station, the global address is used in a zone from the junction point of the station router to the gateway of the center station, and the virtual and real private addresses are used in a zone from the gateway of the center station to the control terminal.

12. An address access system according to claim 10, wherein routing is made in default from the user terminal to the station router and from the station router to the network within the remote station, and routing is made dynamically over the network, and routing is made dynamically within the center station.

13. An address access method in an address access system comprising:
first and second communication stations each being provided with a global address, the first and second communication stations each being a unit that communicates with each other, the first and second communication stations each comprising a terminal to which virtual and real private addresses are assigned, and an address translator determining, from the virtual private address, corresponding real private and global addresses; and
a network to connect the first and second communication stations,
wherein the terminal belonging to the first communication station transmits to the address translator of the first communication station a transmission frame that includes the virtual private address of the terminal belonging to the second communication station,
wherein the address translator of the first communication station transmits the transmission frame to the second communication station after the address translator translates the virtual private address in the transmission frame into the corresponding real private address, while the address translator determines the global address of the second communication station based on the virtual private address and applies the global address to the frame, and wherein the address translator of the second communication station receives the transmission frame to which the global address is attached and sends a content of the transmission frame to the terminal indicated by the real private address included in the transmission frame.

* * * * *